United States Patent Office 3,725,169
Patented Apr. 3, 1973

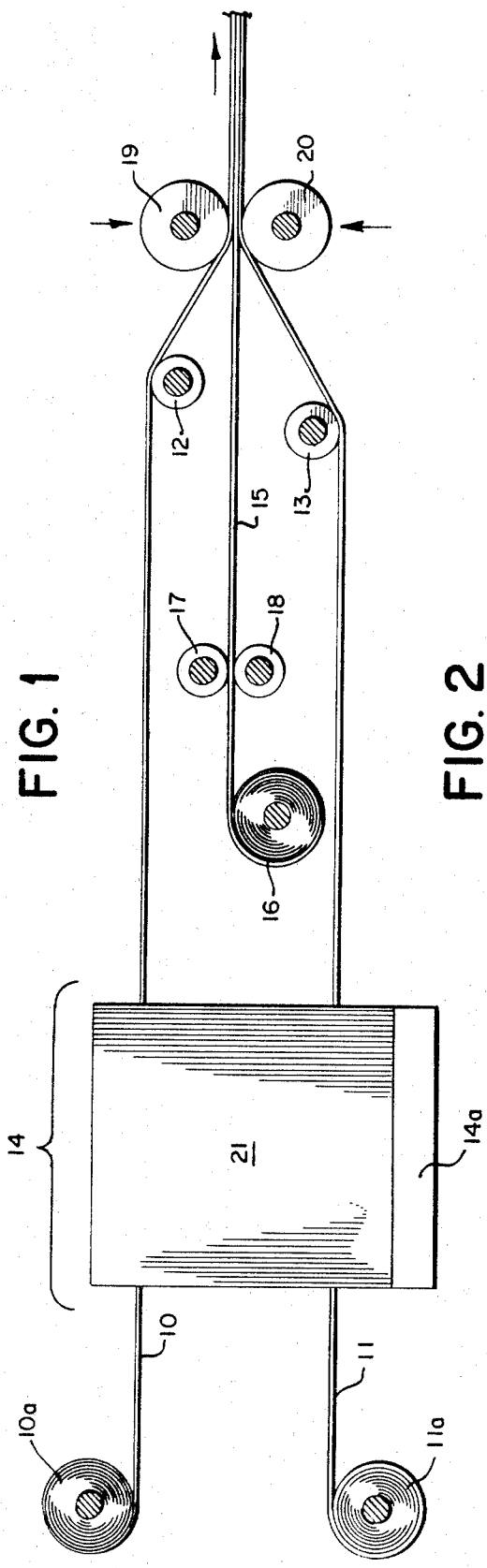
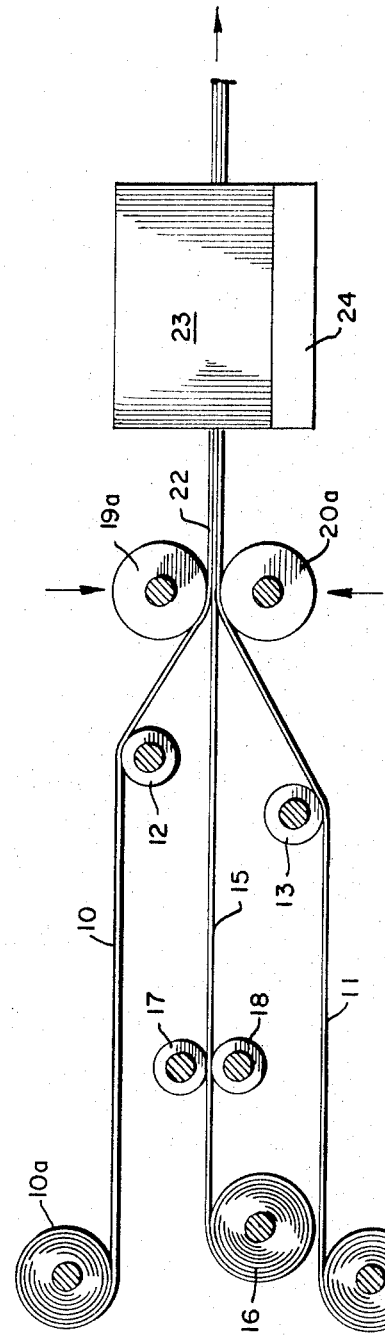
FIG. 1
FIG. 2
INVENTORS
RALPH W. ALLEN
RICHARD F. MARSH
BY
Pennie, Edmonds, Morton, Taylor & Adams
ATTORNEYS

3,725,169
BIMETALLIC LAMINATE AND METHOD OF MAKING SAME
Ralph W. Allen and Richard F. Marsh, Louisville, Ky., assignors to Anaconda Aluminum Company, New York, N.Y.
Continuation of application Ser. No. 696,648, Jan. 9, 1968, which is a continuation-in-part of application Ser. No. 621,258, Mar. 7, 1967. This application June 11, 1971, Ser. No. 152,446
Int. Cl. B31c *13/00*
U.S. Cl. 156—184                                      9 Claims

ABSTRACT OF THE DISCLOSURE

Two metallic sheets, which may be similar metals or dissimilar metals, such as aluminum and stainless steel, are bonded by an intermediate dry thermoplastic film to form a bimetallic laminate. According to a particularly advantageous embodiment of the invention layers to be laminated are wound onto a common core in a predetermined relationship and the three component assembly is then heated to activate the thermoplastic layer, bonding the layers together.

---

This application is a continuation of application Ser. No. 696,648 filed Jan. 9, 1968 now abandoned, which was a continuation-in-part of application Ser. No. 621,258, filed Mar. 7, 1967 and now abandoned.

BACKGROUND OF THE INVENTION

(1) Field of the invention

By laminating two different metals together, it is sometimes possible to obtain the advantages of both while overcoming certain disadvantages of using either metal alone. One metal may for example have desirable surface properties but be highly expensive; if combined in a laminate with a less expensive metal, its surface properties may be obtainable at a fraction of the cost of using a sheet solely of that metal. In particular, by laminating together a sheet of aluminum and a sheet of stainless steel the excellent surface properties of stainless steel and the adequate structural properties of aluminum result in a structure substantially less expensive than comparable structure formed wholly of stainless steel. However, in order to render such a structure commercially feasible, it is necessary to devise a high speed and inexpensive process for its manufacture; otherwise the economic advantages of the structure are offset by the added manufacturing cost.

(2) Description of the prior art

Various bimetallic laminates are known, including some formed of layers of stainless steel and aluminum. The metallic layers have been bonded by various means, some requiring complicated manufacturing processes. No laminate, however, is known in which the metallic layers are bonded together by a dry sheet of thermoplastic resin. Moreover, such laminates have heretofore been produced by discontinuous or batch processes which are relatively uneconomical. For instance, if two metal sheets are laminated by a thermosetting resin, the requisite baking process does not lend itself to a continuous, let alone high speed, operation. Moreover, many prior art processes involved coating one or more of the metal sheets with a liquid adhesive, which then had to be dried before the laminate could be formed, necessitating increased time and expense.

SUMMARY OF THE INVENTION

The invention relates to a novel bimetallic laminate, as well as to a process for making such laminate which renders its manufacture commercially feasible. It has been discovered that by progressively forming into a sandwich two metallic webs and an intermediate web of dry thermoplastic film, a bimetallic laminate can be formed in a continuous operation at a speed much higher than heretofore possible. The two metallic webs and the intermediate web of dry thermoplastic film are progressively brought together and progressively subjected to sufficient heat and pressure to plasticize the thermoplastic film and bond into it both metallic webs. In a preferred embodiment, the metallic webs are stainless steel and aluminum so that the resultant structure combines the desirable properties of each, not obtainable by using only a single metal, and yet is more economical to produce than structures heretofore known. According to a particularly advantageous embodiment of the invention, the metallic and thermoplastic layers are interleaved in a predetermined relationship on a common core, and then heated to activate the thermoplastic layer, bonding the layers together. This embodiment is particularly low in cost to perform, and results in a very uniformly bonded laminate, and bonding takes place under highly uniform pressure.

BRIEF DESCRIPTION OF THE DRAWINGS

The invention will be described in conjunction with the accompanying drawings, in which:
FIG. 1 is a schematic diagram of a process for making a bimetallic laminate as described herein;
FIG. 2 is a schematic diagram of an alternative embodiment of the process for making a bimetallic laminate as described herein.

DESCRIPTION OF THE PREFERRED EMBODIMENTS

Figure 3:
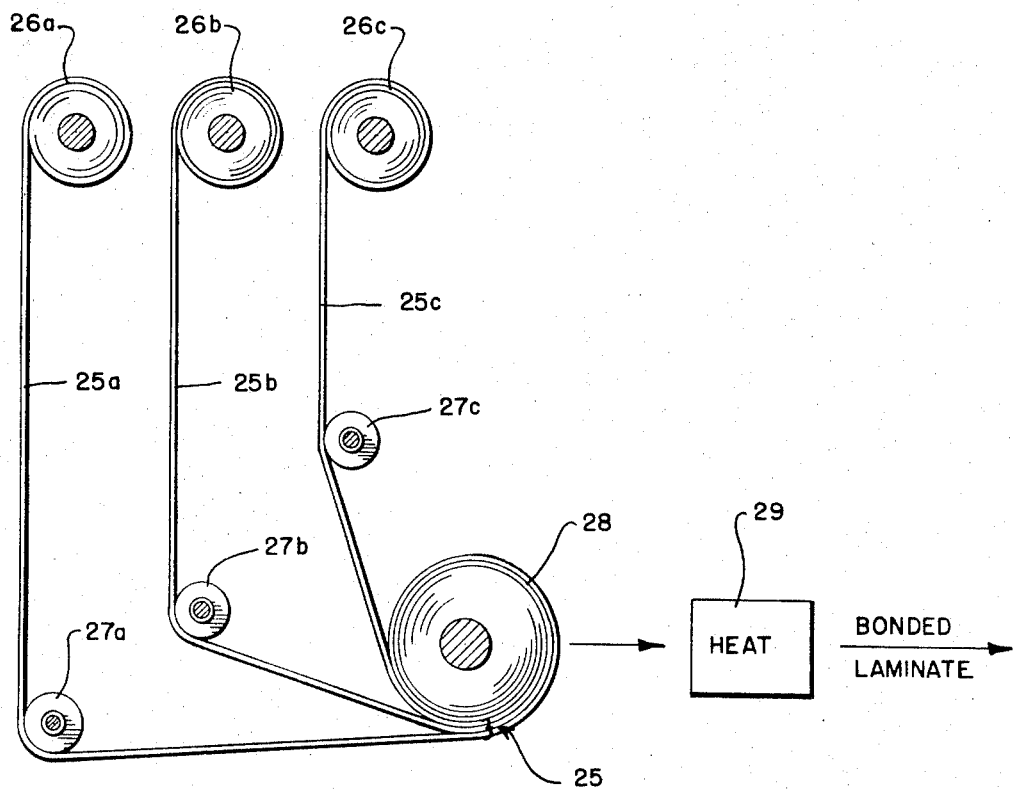
FIG. 3 is a composite schematic and flow diagram illustrating a preferred embodiment of the method of the invention.

In the embodiment of the invention illustrated in FIG. 1, two sheets of metal in the form of webs 10 and 11, which may be drawn from storage roll 10a and 11a, are fed by means of the necessary guidance structure, schematically indicated by idler rollers 12 and 13, through a heating zone 14 where they are progressively heated by by a heater 14a to some predetermined temperature. The webs may be heated either together or separately, and the means by which they are heated is immaterial, except that it cannot be of a kind which would render the surface of the metal unfit for bonding to a thermoplastic film. The heated metal webs are then joined, after passing through the heating zone 14, by a third intermediate web 15 of dry thermoplastic film which is guided between webs 10 and 11, for instance by idler rollers 17 and 18. The web 15 may be drawn from a storage roll 16 disposed between the webs 10 and 11. The webs 10, 11 and 15 are then passed between pressure rollers 19 and 20 which apply sufficient pressure to the sandwich formed by the three webs, in conjunction with the heat previously applied to the webs 10 and 11, to plasticize the thermoplastic web 15 and to bond thereto the metallic webs 10 and 11.

The bonded sandwich may then be cooled by any convenient means; exposure to ambient temperature for a few seconds in the course of the web's travel may be sufficient. In the heating zone 14 the webs 10 and 11 may be surrounded by thermally insulating walls forming an oven 21 to reduce heat transfer to the atmosphere. It may in some cases be desirabe to extend the wall 21 to the point where the webs 10, 11 and 15 are bonded together, that is, at the pressure rollers 19 and 20.

FIG. 2 illustrates an embodiment of the invention in which heat is applied to the webs at the point where they are brought together to form a sandwich. In addition, a post-heat zone is provided for applying heat to the already bonded sandwich where necessary in order to assure a smooth, continuous and reliable bond.

In FIG. 2 (in which the same numerals as appear in FIG. 1 indicate elements corresponding to those of FIG. 1) metallic webs 10 and 11 are fed from storage rolls 10a and 11a, over idler rolls 12 and 13, and between pressure rollers 19a and 20a. A web 15 of dry thermoplastic film is drawn from a storage roll 16, through idlers 17 and 18, and is combined with the metallic webs 10 and 11 as they pass through the pressure rollers 19a and 20a to progressively form a sandwich 22.

The pressure roller 19a and 20a incorporate electrical heating units within them. Alternatively, combustion type heaters may be used, or the heat source may be placed in thermal communication with the peripheries of the pressure rollers rather than within them.

A post-heat oven 23 containing a heater 24 is shown in FIG. 2 for heating the sandwich 22 after the individual webs 10, 11 and 15 have been bonded together by pressure rollers 19a and 20a. Provision of a post-heating section is advantageous under certain conditions, such as where relatively thick webs of metal are bonded, to assure formation of a smooth, continuous bond. It should be adjusted to heat the bonded sandwich to a temperature approximately the same as or slightly below that to which it was heated initially, so that the thermoplastic film is plasticized sufficiently to assure the desired uniform bond, but not to such an extent that the layers of the sandwich tend to separate.

The sandwich 22 is subsequently cooled. Cooling may be accomplished in the embodiment of FIGS. 1 and 2 by liquid cooled rollers directly following the pressure rollers (following the post-heat oven 23, in the emodiment of FIG. 2) or by exposure to sufficiently cool ambient conditions. It is necessary, whatever the method of cooling employed, that the sandwich 22 not be subjected to mechanical forces which would tend to cause separation of its constituent layers until after it has cooled sufficiently.

The amount of heat which must be applied to the sandwich (or various ones of its constituent layers) must be sufficient so that the sandwich temperature at the pressure rollers (19, 20 or 19a, 20a) is high enough to properly plasticize the thermoplastic film and bond to it the metal webs under the pressure there provided. This amount of heat will depend, therefore, on such factors as the metals to be bonded, their thicknesses, the distance between the point at which the webs are heated and that where they are bonded together and web speed.

Alternatively to the above-described embodiments, the laminate may be made by first laminating a layer of dry thermoplastic film to a layer of metal, and subsequently, combining a second layer of metal with the metal-film laminate so formed. Either or both steps may be carried out using apparatus shown in FIGS. 1 and 2.

FIG. 3 illustrates an embodiment of the invention which is particularly advantageous because of its low cost and the highly uniform characteristics of the resultant laminate.

Generally according to this embodiment the metallic webs and the thermoplastic web are interleaved in a predetermined relationship onto a common core, and then heated to activate the thermoplastic layer. As shown schematically in FIG. 3 metallic webs 25a and 25c and a dry thermoplastic web 25b are unwound from respective cores 26a and 26c and 26b. The webs are guided by the requisite guidance structure, indicated schematically by rollers 27a, 27b and 27c, in such a way that they are interleaved in a predetermined desired relationship on a common core 28. The core 28 and the webs 25a, 25b and 25c wound upon it are then heated, as indicated diagrammatically by the block 29, so that the thermoplastic web 25b is activated and the adjacent metallic webs 25a and 25c are bonded to it. The composite laminate 25 may then be unwound from the core 28 and used for any desired purpose.

The layers 25a, 25b and 25c should be wound onto the core 28, which may be for example a steel drum, under sufficient tension to avoid wrinkles and to provide adequate pressure between adjacent layers so that a good, continuous bond results when heat is applied.

The relationhip of the positions of the layers on the common core 28 is determined by the particular laminate desired. If the laminate is to be of two metals having contiguous edges and bonded over their entire common surface, then metallic webs of the same width should be wound onto the common core, and the intervening dry thermoplastic web should be of a width slightly less than the metal webs, to avoid extrusion of the thermoplastic beyond the metal edges during heating. Alternatively, one of the metal webs may be wider than the other, if desired in the resultant laminate.

According to one embodiment of the invention, if a relatively narrow strip one metal is to be bonded to a wide strip of another, the narrower strip may initially be bonded to a thermoplastic layer by a method such as is described above, and then the metal-thermoplastic composite may be wound onto a core along with the wider metal web, centered or otherwise positioned, as desired, and the core heated to bond the three layers firmly together. In some cases it may be desirable to laminate the initial metal-thermoplastic composite in widths wider than ultimately desired and subsequently slit the composite to the desired width. Particular advantage may be obtained in such case by interleaving the metal-thermoplastic composite with the second (wider) metallic web as the latter comes from the slitting knife.

The last-mentioned embodiment of the invention is of particular advantage in the manufacture of automobile trim. Attempts have been made to make automobile trim, such as brightwork strips placed along the exterior of the car body, out of stainless steel. These attempts have not met with complete success, however, because exposure to road conditions, for example salt spray, causes extensive corrosion of the car body where it abuts the stainless steel strip. Automobile brightwork which avoids this drawback may be made in the form of stainless steel-aluminum laminates in accordance with this invention, by making the aluminum strip greater in width than the stainless steel, and forming the strip so that the aluminum component alone is in contact with the automobile body. In this case, road exposure results in slight corrosion of the aluminum, but not of the car body. Automobile trim of this material may be economically mass produced by first forming a relatively wide sheet of stainless steel-thermoplastic composite (say, 40 inches wide), slitting the composite so formed into one inch strips which are wound onto individual cores. A relatvely wide (e.g. 40 in.) aluminum sheet may then be slit into two-inch strips, so that as each strip leaves the slitting knife, it is combined with a composite strip taken from an individual core and each three-component assembly is wound onto a separate core, which may subsequently be heated to form a strip laminate in accordance with the invention. While it is possible to form such laminate by combining slitting of the composite with the addition of an aluminum strip, this is not ordinarily suitable to mass production techniques such as described above because of the greater width of the aluminum strip.

Heating the pre-wound layers may be done in a conventional oven, for example a gas-fired annealing oven, which has preferably been pre-heated. The temperature of the oven should be higher than the activation temperature of the thermoplastic used. For example, if bonding takes place at 350° F., the oven may be maintained at an air temperature of about 400° F. The three-component rolls should be left in the oven long enough for the entire roll to attain a temperature of between 350° F. and 400° F.

The time required will depend on the thickness of the several layers as well as the particular metals involved and the size of the roll.

The laminate unwound from the core will ordinarily have a pre-set, or curvature (as will many metals unwound from rolls), which can be eliminated if desired by merely passing the laminate over one or more rollers.

The last described embodiments of the method of this invention are of particular advantage in that improved adhesion (bond strength) is obtained without formation of air blisters (as occurs with a platen press), at low labor and equipment costs, resulting in higher productivity.

The product of the above-described processes is a bi-metallic laminate less costly to produce than any heretofore known. Either similar or dissimilar metals may be bonded by the process; however, it is especially useful for bonding together sheets of aluminum and stainless steel to form an aluminum-stainless steel laminate. This laminate has the desirable working properties of aluminum as well as the desirable surface properties of stainless steel, such as high abrasion resistance and heat and acid resistance. In addition, becaue a dry thermoplastic film rather than a liquid or other composition is used to bond the laminate, it can be manufactured in a continuous operation at a lower cost than heretofore possible. The thermoplastic film layer gives the laminate good thermal and electrical resistance, making it useful for instance in the construction of exterior panels for trailer truck bodies, liners for freezer units, and automotive trim.

The thickness of aluminum and stainless steel used for any given application will be determined by the desired end parameters. In general, however, it has been found that a ratio of aluminum thickness to stainless steel thickness in the range between about 2½-to-1 and 10-to-1 is satisfactory and that the resultant laminate exhibits excellent shear strength. The highly polar groups on the polymer give excellent plastic-to-metal adhesion characteristics not before obtainable except in extrusion lamination, where the polymers are thermally degraded by operational heat (600° F.) and thereby obtain carboxyl polarity.

The following examples will aid in clarifying the process herein disclosed but should not in any way be construed as limiting it:

EXAMPLE I

A 0.010 inch web of aluminum sheet and a 0.003 inch web of stainless steel sheet are processed in the apparatus of FIG. 1 at a web speed of 450 feet per minute. Both metallic webs are heated by air currents in a convection oven so that the temperature of the sandwich at pressure rollers 19 and 20 is 400° F. A dry permanently thermoplastic film, Du Pont's Surlyn film (a trademark of E. I. du Pont de Nemours & Co., Wilmington, Del.), which is a copolymer of 92 percent ethylene and 8 percent acrylic acid which is 0.002 inch thick is used in the sandwich so that the resultant laminate is 0.015 inch thick. The sandwich is compressed by the rollers 19 and 20 under a force of about 100 lbs./sq. inch.

EXAMPLE II

A 0.020 inch web of aluminum sheet and a 0.005 inch web of stainless sheet are combined in the apparatus of FIG. 2 along with a 0.003 inch web of Dow Chemical Company PZ4333.9 (a trademark of Dow Chemical Company, Midland, Mich.) which is a copolymer of 92 percent ethylene and 8 percent acrylic acid which is a dry permanently thermoplastic film, at a rate of 300 feet per minute. An oven is used to produce a temperature in the sandwich at pressure rollers 10a and 20a of about 430° F., and the force exerted by the rollers is about 100 lbs./sq. in. A gas post-heat oven is set to reheat the sandwich to about 410° F. The resultant laminate is 0.028 inch thick.

EXAMPLE III

A 0.025 inch thick web of aluminum sheet and a 0.010 inch thick web of copper are drawn from cores interleaved with a 0.003 inch thick web of Dow Chemical Company's PZ4333.9 (a trademark of Dow Chemical Company, Midland, Mich.), also drawn from a core, onto a common core. The three webs are interleaved in a predetermined position on the core such that the thermoplastic web is between the copper and aluminum webs, centered with respect to them and about ⅛ inch narrower than them. The three webs are wound onto the common core under tension sufficient to produce a pressure between layers of about 50 lbs./s. in. The roll thus formed is placed in a gas fired oven pre-heated to 400° F. until the temperature of the roll stabilizes at between 350° F. and 400° F., thereby activating, or plasticizing, the thermoplastic, then removed from the oven.

EXAMPLE IV

A 0.020 inch thick web of aluminum sheet is bonded to a 0.003 inch thick web of Surlyn film (a trademark of E. I. du Pont de Nemours & Co., Willmington, Del.) using the apparatus of FIG. I at a web speed of 450 feet per minute and at a temperature of 350° F. Then the composite so formed is longitudinally slit to form composites of narrower width. Each narrow composite so formed is interleaved centered on a second and slightly wider metallic web as the latter leaves the slitting knife, and the webs are wound onto a common core. Each roll so formed is then placed in a gas-fired oven pre-heated to 400° F. until the roll stabilizes at a temperature of between 350° F. and 400° F.

It will be apparent that the invention is not limited to the specific features in the above-described preferred embodiments and that various modifications may be made without departing from its scope as defined in the claims.

We claim:

1. A method of making a metallic laminate, comprising:
    winding onto a common core two metal webs and an intermediate web of dry thermoplastic film so that the webs are interleaved; and
    heating and pressing the roll thus formed at a pressure and temperature sufficient to plasticize the thermoplastic film and bond it to the metallic webs, but at a temperature below that at which the thermoplastic resin in the film is thermally degraded to activate the thermoplastic web, thereby bonding to it the two metal webs.

2. A method as defined in claim 1 wherein said webs are wound onto the common core under tension sufficient to provide pressure between the webs so wound which is adequate to bond the webs together upon heating the roll.

3. A method as defined in claim 2 wherein said metal webs are respectively stainless steel and aluminum.

4. A method of making a metallic laminate, comprising:
    bonding together a metal web and a dry thermoplastic web to form a metal-thermoplastic composite;
    winding the composite and a second metal web onto a common core such that the webs are interleaved in the order, metal-thermoplastic-metal; and
    heating and pressing the roll so formed at a pressure and temperature sufficient to plasticize the thermoplastic film and bond it to the metallic webs, but at a temperature below that at which the thermoplastic resin in the film is thermally degraded to activate the thermoplastic web and bond to it the second metal web.

5. A method as defined in claim 4 wherein the composite and the second metal web are wound onto the core under tension sufficient to provide pressure between the webs so wound which is adequate to bond the webs together upon heating the roll.

6. A method as defined in claim 5 wherein said composite is slit longitudinally into plural thermoplastic metal composite strips prior to being wound with a second metal web onto a common core.

7. A method as defined in claim 6 wherein said second metal web is slit from a wider web in a slitting operation and is interleaved with said composite strips in conjunction with said slitting operation, such that as the second metal web is slit it is interleaved with the composite strips such that the webs are interleaved in the order metal-thermoplastic-metal and wound directly onto the common core.

8. A method of mass producing a plurality of metallic laminates comprising:
    bonding together a metal web and a dry thermoplastic web to form a metal-thermoplastic composite;
    slitting said composite into narrow composite strips and winding such composite strips onto first cores;
    slitting a second metal web in a slitting operation into strips, each of which is wider than one of said composite strips;
    interleaving one of said composite strips with each of said metal strips, as the latter are slit in said slitting operation, such that the webs are interleaved in the order metal-thermoplastic-metal, winding each laminate strip so formed onto a second core; and
    heating the roll so formed on such core to activate the thermoplastic web thereon and bond to it the metal strip.

9. A method as defined in claim 8 wherein said metal web is stainless steel and said second metal web is aluminum.

References Cited
UNITED STATES PATENTS

| | | | |
|---|---|---|---|
| 3,045,285 | 7/1962 | Baird et al. | 150—184 X |
| 3,454,445 | 7/1969 | Durst et al. | 161—219 X |
| 3,455,775 | 7/1969 | Pohl et al. | 161—217 X |
| 3,432,373 | 3/1969 | McMahon | 156—184 |
| 3,470,052 | 9/1969 | Herman | 156—184 |
| 3,481,812 | 12/1969 | Holub et al. | 161—216 |

FOREIGN PATENTS

| | | | |
|---|---|---|---|
| 951,266 | 3/1964 | Great Britain | 161—216 |
| 1,014,154 | 12/1965 | Great Britain | 161—216 |

EDWARD G. WHITBY, Primary Examiner

U.S. Cl. X.R.

156—259, 264, 309; 161—145, 216